UNITED STATES PATENT OFFICE.

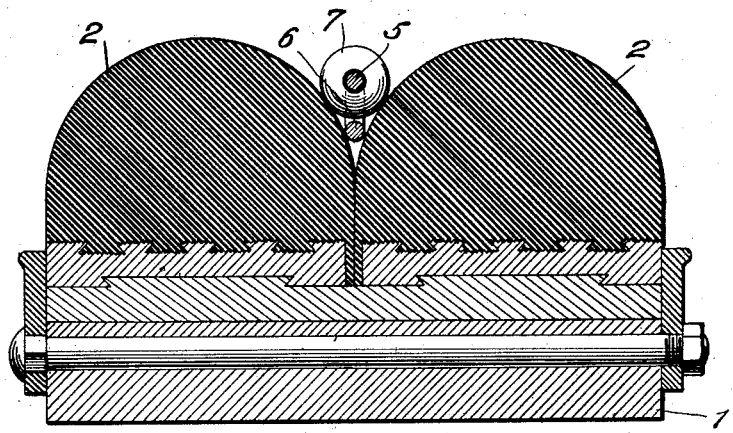
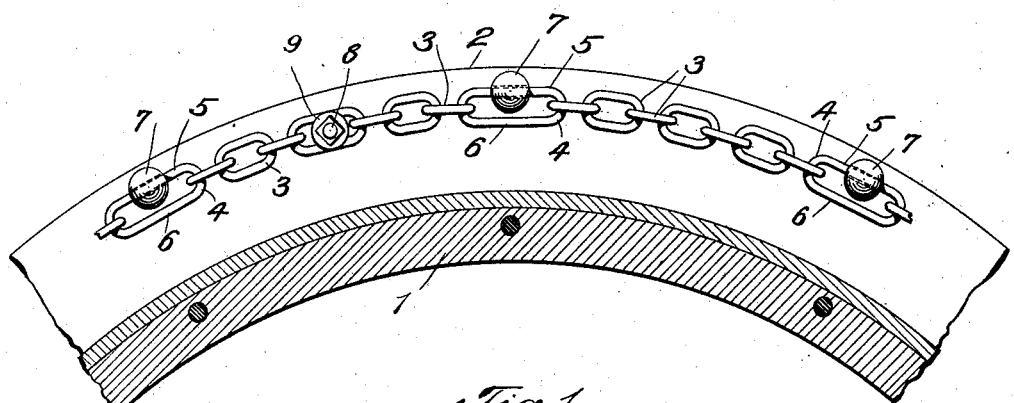

JOHN V. KNOTH, OF NEW YORK, N. Y., ASSIGNOR TO POLACK TYRE COMPANY, A CORPORATION OF MAINE.

ANTISKIDDING ATTACHMENT.

1,049,734.  Specification of Letters Patent.  Patented Jan. 7, 1913.

Application filed November 22, 1911. Serial No. 661,649.

*To all whom it may concern:*

Be it known that I, JOHN V. KNOTH, a citizen of the United States, residing at the city of New York, in the borough of Manhattan and State of New York, have invented certain new and useful Improvements in Antiskidding Attachments, of which the following is a full, clear, and exact description.

This invention relates to vehicle tires and more particularly to anti-skidding attachments for tires of solid rubber, or the like, of the well known "dual" type commonly used upon heavy trucks.

Devices of this character are usually highly injurious to the tires, cutting and tearing them in use, and they become quickly worn away in practice to such an extent as to be practically worthless.

One of the objects of my invention is to provide an efficient anti-skidding attachment for vehicle tires that will exert a minimum wearing action upon the tire and which will withstand long and hard usage without impaired effectiveness.

Another object of my invention is to provide a construction simple and cheap to manufacture and composed of a minimum number of parts.

These and other objects of my invention will be hereinafter referred to and the novel elements and combinations of elements whereby said objects are accomplished will be more particularly set forth in the appended claims.

In the accompanying drawings which form a part hereof, and in which like reference characters designate like parts throughout the several views, I have exemplified a preferred form of my invention. I am aware, however, that various modifications and changes may be made therein without departing from the spirit of my invention, and I accordingly desire to be limited only by the scope of the appended claims.

In the drawings: Figure 1 is a side view of a portion of my improved anti-skidding attachment or chain, applied to a fragment of a dual vehicle tire, the tire being shown in longitudinal central cross-section; and Fig. 2 is a cross-section of a dual tire and of my improved anti-skidding chain, drawn to a slightly larger scale than Fig. 1.

Referring to the drawings by numerals, 1 indicates a wheel felly to which are secured in any suitable manner the two members of a dual tire, designated 2, of rubber or the like. Mounted in the triangular groove between the two members of the tire is my improved anti-skidding chain consisting of links 3 and 4 of steel or like material. The links 4 are considerably longer than the links 3 and are spaced apart by a plurality of the links 3. The parallel side members of links 4 have been designated 5 and 6, and mounted upon members 5 are spherical balls 7, of steel or like material. These balls are free to rotate upon the members 5, which act as axes or spindles, and are also slidable longitudinally thereon; they are shown in the drawings to be of a diameter approximately equal to the exterior width of the links 3 and 4.

It is to be understood, of course, that my chain encircles the entire wheel tire, its ends being secured together in any manner whereby they may be readily attached to, and detached from, the tire. The drawing shows (Fig. 1) the ends of the chain attached together by means of a bolt 8, provided with a washer 9, which bolt engages the two end links of the chain, and a suitable washer and nut (not shown) on the other side of the chain. Obviously, however, a turnbuckle or like means may be used for this purpose if desired.

My improved chain is mounted upon the tire in such a way that the side members 6 of the links 4 wedge into the triangular groove between the two members of the tire, and links 3 engage on either side the two tire members thus positioning the balls 7 between the inner arcuate faces of the members 2, said balls extending from the wheel felly a distance slightly less than the tire members, where it has been found they exert the greatest anti-skidding effectiveness.

In use any transverse pressure upon the tire, caused by the vehicle making a turn, will press the balls 7 against one or the other of the arcuate faces of the tire members, depending of course upon the direction of the transverse pressure. The balls 7 will be caused to rotate about their axes 6 and their direction of rotation will always be such as to press the face of that portion of the tire with which they happen to be in contact, toward its base. In other words, if the balls are pressed against the right hand member of the tire, as viewed in Fig. 2, the direction of rotation of the balls will be clockwise, whereas they will rotate in the opposite direction if pressed against the left hand member. It will thus be seen that the balls, while tending to arrest skidding action, minimize the tendency to strip the tire from the wheel by reason of its contact with the roadbed, since said balls when under transverse stress keep constantly rolling the rubber of the tire in toward the wheel.

Another important advantage possessed by my invention resides in the fact that as the balls rotate, the wear thereon is distributed over their entire circumference and is not confined to one portion only which would soon wear them flat and neutralize their efficiency. This of course adds greatly to the life of the device.

Another advantage is gained by the longitudinal play of the balls on their axes, since they are thus brought into engagement with different portions of the rubber tire in use, thus preventing the injurious effect of continued wear upon the tire at one point. Furthermore the fact that the chain is preferably not rigidly fixed to the tire at any point, allows it to work around the tire and further prevents the balls from wearing the tire at any given points.

Obviously more or fewer of the elongated links with their rotating balls may be used, as found desirable.

I do not desire to be limited to balls of absolutely spherical configuration, since elongated rollers might be used within the purview of my invention, but I have found in practice that the spherical balls give the best results. Neither do I desire to be limited to a chain to connect the links 4, since any suitable flexible means may be used for this purpose, my invention residing in the provision of the rotating elements which I have found constitute very effective anti-skidding means.

If found desirable, I may mount more than one revoluble member on the spaced links 4, and may make these links longer to accommodate a plurality of revoluble members and may curve the links to conform to the shape of the tire.

It is to be observed that my invention is not limited in use to the particular type of dual tire shown in the drawing since it is adapted for use with any tire having a circumferential groove in its tread.

Having described my invention, I claim:

1. In an anti-skidding attachment for a resilient dual vehicle tire having a groove between the respective sides thereof, a flexible carrier adapted to be received into the groove aforesaid, said flexible carrier encircling the tire when in position thereon, a plurality of spaced rollers rotatably mounted upon said carrier, said rollers adapted to bear directly against the tire parts and having smooth surfaces at points where they contact with said parts whereby to obviate the likelihood of injuring the tire when forcibly driven theretoward, said surfaces being substantially devoid of sharp bends and angles, and the axes of rotation of the respective rollers being substantially tangential to the encircling carrier.

2. In an anti-skidding attachment for a dual vehicle tire having a groove between the respective sides thereof, a flexible carrier adapted to be received into the groove aforesaid, said flexible carrier encircling the tire when in position thereon and comprising a plurality of oval links, rollers mounted upon said links, the axes of rotation of said rollers in each case passing through one side only of the respective links, said rollers adapted to bear directly against the walls of the groove aforesaid and to frictionally engage the same.

3. A resilient dual vehicle tire having a groove between the respective sides thereof, in combination with a chain adapted to be received into said groove, said chain encircling said tire, links on said chain having rollers mounted thereon, each of said rollers being disposed upon one side only of the link upon which it is mounted, said rollers being adapted to rotate in a direction transverse to said tire, and being further adapted to slide longitudinally upon said links.

In witness whereof, I subscribe my signature, in the presence of two witnesses.

JOHN V. KNOTH.

Witnesses:
WALDO M. CHAPIN,
WM. M. STOCKBRIDGE.